United States Patent

Rowe

[11] 4,229,855
[45] Oct. 28, 1980

[54] WHEEL UNITS
[76] Inventor: Anthony P. V. Rowe, 1, Royal Crescent, London W. 11, England
[21] Appl. No.: 13,285
[22] Filed: Feb. 21, 1979
[51] Int. Cl.² .......................................... B60B 33/00
[52] U.S. Cl. ......................................... 16/29; 16/31 R
[58] Field of Search .................... 16/29, 38, 31 R, 40, 16/18 R

[56] References Cited

U.S. PATENT DOCUMENTS

| | | | |
|---|---|---|---|
| 835,492 | 11/1906 | Baker | 16/31 R |
| 1,836,246 | 12/1931 | Herold | 16/18 R |
| 2,174,661 | 10/1939 | Hope et al. | 16/18 R |
| 3,639,942 | 2/1972 | Ostrom | 16/29 |
| 3,894,310 | 7/1975 | Screen | 16/47 |

FOREIGN PATENT DOCUMENTS 723792  1/1932  France ...................................... 16/29

Primary Examiner—George H. Krizmanich
Attorney, Agent, or Firm—Scrivener, Parker, Scrivener and Clarke

[57] ABSTRACT

A wheel unit for attachment with like units to for example a cardboard box to create a wheeled toy for a child comprises a mounting member having three generally orthogonal parts defining a corner for receiving a corner of the cardboard box, a wheel rotatably mounted on the mounting member, and means for fixing the mounting member to the cardboard box.

8 Claims, 3 Drawing Figures

WHEEL UNITS

The present invention relates to a wheel unit which, with like wheel units, can be engaged with an article, e.g. a cardboard box, to provide a child with a wheeled toy.

According to the present invention, a wheel unit comprises a mounting member for releasably fixing to an article to be provided with the wheel, and a wheel for rotation relative to the mounting member.

The mounting member may comprise at least one part for overlying a wall of the article and that part may be provided with an aperture for receiving fixing means for fixing the unit to the article, or may be provided with fixing means.

Preferably the mounting member includes at least two parts extending generally perpendicular to each other for overlying the base and a side wall of the article.

Advantageously the mounting member includes three parts extending generally orthogonally and defining a corner for receiving a corner of the article. One, two or all of the parts may be provided with apertures for receiving fixing means or with fixing means.

A stub shaft for the wheel may be fixed to, and extend from, the mounting member. The wheel is then rotatably mounted on the stub shaft and retained thereon either permanently or removably. Removable retaining means may comprise a cap which snap fits on to the free end of the stub shaft.

Figure 1:
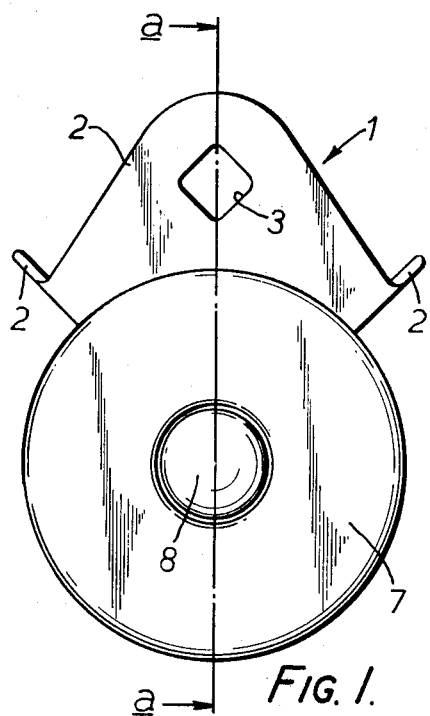
Figure 2:
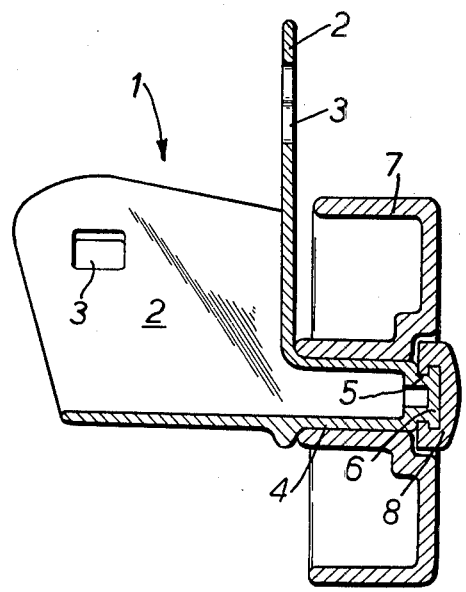
Figure 3:
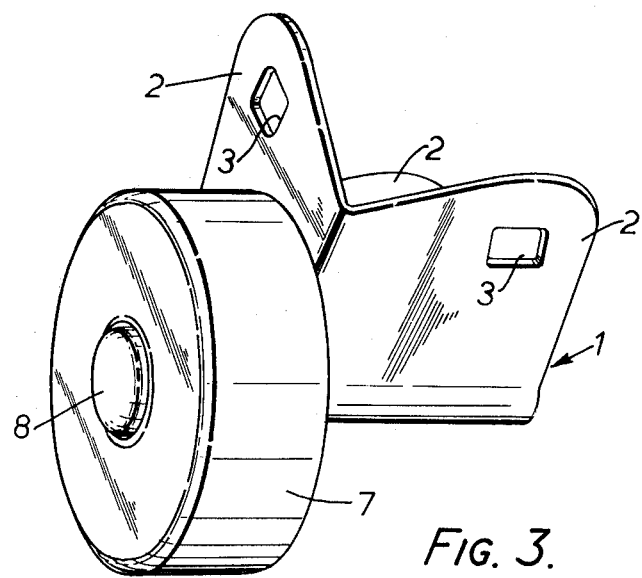

The invention will be more fully understood from the following description of an embodiment thereof, given by way of example only, with reference to the accompanying drawings, in which:

FIG. 1 is a side view of an embodiment of a wheel unit according to the present invention, FIG. 2 is a section on the line a—a of FIG. 1, and FIG. 3 is a perspective view of the unit of FIG. 1.

As shown in the drawings, the wheel unit comprises a mounting member 1 comprising three orthogonal parts 2 defining a corner and for engagement with a corner of e.g. a cardboard box or carton. At least one, and as shown all three of the parts 2 are provided with apertures 3 for receiving fixing means. The fixing means may comprise a nut and bolt, the bolt of which extends through an aperture 3 and a hole made in the carton wall. The bolt preferably has a polygonal, e.g. a square, section shank adjacent the head and the aperture 3 is correspondingly sectioned to retain the bolt against rotation. The bolt may have a slightly pointed end to facilitate location in the aperture 3 and hole and easy start fast threads. The nut may for example be a wing nut. Alternatively the fixing means may be fast with the parts 2. Fixed to and extending from the mounting member 1 and, as shown integral herewith, is a stub shaft 4 which is provided at its free end with a neck 5 defining a head 6. The wheel 7 is received on the shaft 4 for rotation relative thereto and is held on the shaft by a retaining member, e.g. a cap 8, which snap fits over the head 6 and engages in the neck 5 of the shaft 4.

The components of the wheel unit may be moulded of plastics material and the shaft 4 may be moulded integrally with the mounting member 1.

In use two or four like wheel units are used, the mounting members being arranged around two adjacent, or all four, lower corners of e.g. a cardboard box. The walls of the box are provided with holes in register with those in the mounting members and the mounting members are then fixed to the box by the bolts and nuts.

There is thus provided a wheel unit which can be simply and easily attached to any suitable article, e.g. a cardboard box or carton, by an adult or a child to provide the child with a wheeled toy. The units are removable from the article so that they can be used with another article.

It will be appreciated that the above described wheel unit may be modified in a number of different ways. For example the wheel may be permanently mounted on the mounting member 1, or the removable wheel retaining means may have other different forms than the cap shown in the drawings. For example, the retaining means may be integral with the shaft and such that the wheel can be forced past them. The mounting member may comprise only two parts for overlying for example the bottom and one side wall of the carton, and the wheel may have an integral axle which is rotatably engaged in the mounting member.

What is claimed is:

1. A toy wheel unit comprising a mounting member comprising three generally orthogonal parts defining a closed corner for receiving a closed corner of an article to be provided with a wheel, a stub shaft integral with said mounting member, a wheel rotatably mounted on said stub shaft, means for retaining said wheel on said stub shaft, and means for releasably fixing said mounting member to the article.

2. A wheel unit as claimed in claim 1, wherein said retaining means comprises a retaining member for engagement with the free end of said stub shaft.

3. A wheel unit as claimed in claim 1, wherein said retaining means are integral with said shaft.

4. A wheel unit as claimed in claim 1 wherein said fixing means comprises nut and bolt means and at least one of said parts of said mounting member is apertured to receive said bolt means.

5. A wheel unit as claimed in claim 1, wherein said stub shaft extends outwardly from the apex of said corner defined by said mounting member.

6. A wheel unit as claimed in claim 4, wherein the or each said apertured part of said mounting member is provided with a polygonal section aperture for receiving a said bolt means which is provided with a correspondingly sectioned shank adjacent the heat thereof.

7. A toy wheel unit comprising a mounting member comprising three generally orthogonal parts defining a closed corner for receiving a closed corner of an article to be provided with a wheel, a stub shaft integrally connected by one end to said mounting member and extending outwardly from the apex of the corner defined by said mounting member parts, a wheel rotatably mounted on said stub shaft, retaining means provided on the other end of said stub shaft for retaining said wheel on said stub shaft, and fixing means for releasably fixing said mounting member to the article.

8. A wheel unit as claimed in claim 7, wherein each of said parts of said mounting member is provided with a polygonal aperture and said fixing means comprise bolts to be received in said apertures, each bolt having a head and a shank, the part of said shank adjacent said head having a section corresponding to the shape of the respective said aperture.

* * * * *